(12) United States Patent
Fein et al.

(10) Patent No.: US 7,881,901 B2
(45) Date of Patent: Feb. 1, 2011

(54) METHOD AND APPARATUS FOR HOLOGRAPHIC USER INTERFACE COMMUNICATION

(75) Inventors: Gene S. Fein, Lenox, MA (US); Edward Merritt, Lenox, MA (US)

(73) Assignee: Gefemer Research Acquisitions, LLC, Wilmington, DE (US)

( * ) Notice: Subject to any disclaimer, the term of this patent is extended or adjusted under 35 U.S.C. 154(b) by 62 days.

(21) Appl. No.: 11/857,161

(22) Filed: Sep. 18, 2007

(65) Prior Publication Data

US 2009/0076766 A1 Mar. 19, 2009

(51) Int. Cl.
*G01C 23/00* (2006.01)

(52) U.S. Cl. ............... 702/150; 702/152; 702/153; 345/156; 345/173; 715/850; 715/851; 715/852

(58) Field of Classification Search ............... 702/150, 702/152–153; 359/9–15, 619, 631, 23; 345/156, 345/168, 419, 158, 166, 173; 250/221, 208.1; 353/44; 715/850–852

See application file for complete search history.

(56) References Cited

U.S. PATENT DOCUMENTS

| | | | |
|---|---|---|---|
| 6,031,519 A | 2/2000 | O'Brien | |
| 6,377,238 B1 | 4/2002 | McPheters | |
| 7,054,045 B2 | 5/2006 | McPheters et al. | |
| 7,185,271 B2 | 2/2007 | Lee et al. | |
| 7,262,783 B2 | 8/2007 | Kramer et al. | |
| 2002/0070921 A1 | 6/2002 | Feldman | |
| 2006/0055993 A1 | 3/2006 | Kobayashi | |
| 2007/0169066 A1 | 7/2007 | Nielson | |
| 2008/0079723 A1* | 4/2008 | Hanson et al. | ............... 345/427 |
| 2008/0231926 A1* | 9/2008 | Klug et al. | ............... 359/23 |

* cited by examiner

*Primary Examiner*—Drew A Dunn
*Assistant Examiner*—Hien X Vo

(57) ABSTRACT

A system and corresponding method for providing a 3 dimensional (3-D) user interface display images in a 3-D coordinate system. Sensors are configured to sense user interaction within the 3-D coordinate system, so that a processor may receive user interaction information from the sensors. The sensors are able to provide information to the processor that enables the processor to correlate user interaction with images in the 3-D coordinate system. The system may be used for interconnecting or communicating between two or more components connected to an interconnection medium (e.g., a bus) within a single computer or digital data processing system.

10 Claims, 5 Drawing Sheets

METHOD AND APPARATUS FOR HOLOGRAPHIC USER INTERFACE COMMUNICATION

BACKGROUND OF THE INVENTION

A graphical user interface (GUI) is a type of computer application user interface that allows people to interact with a computer and computer-controlled devices. A GUI typically employs graphical icons, visual indicators or special graphical elements, along with text, labels or text navigation to represent the information and actions available to a user. The actions are usually performed through direct manipulation of the graphical elements.

Holographic images can be created as single or consecutive images using available holographic technology. These technologies include mirrors, lasers, light and images strategically positioned to cause the proper reflection to yield a holographic image broadcast through an entry point in the laser and mirror positioning system. Black background and rooms with low or no light may enhance the appearance of the holographic image or images, which may also use a holographic plate as a display medium. Holographic systems may be large in size and spread out over a large broadcasting area or may be compact enough to fit in spaces smaller than a desk top. Holographic technology is only limited in size by the size of the component parts. By using holographic technology, images may be displayed multi-dimensionally, rather simply on a planar projection.

Currently progress has been made in technologies that can enhance the capability and range of holographic media in projects that employ multi-million mirror systems and via companies that have designed specialized high speed and high capacity micro processors for specialized jobs, other than holographic systems, where the technology could be applied to holographic technologies to make possible the proper positioning of millions of mirrors at a rate of between 24 to 60 or more frames of video per second, with corresponding synched audio.

Holographic displays generated over the last 20-year period utilize various configurations including lasers with images on glass plates such as an AGFA 8E75HD glass plate or other glass plates as well a laser such as a Spectra Physics 124B HeNe laser, a 35 mW laser diode system utilizing different processing methods such as pyrochrome processing. Split beam techniques can also be used Multi H1 to Multi H2. Such configurations as 8×10, triethanolomine, from Linotronic 300 image setter film are also commonly utilized or a configuration with rear-illuminated for 30×40 cm reflection hologram, where a logo floats 18-inches in front of the plate.

SUMMARY OF THE INVENTION

Some user interfaces have adopted a multi-dimensional interface approach. For example, the "heliodisplay" of 102 Technology, LLC of San Francisco, Calif. projects images into a volume of free space, i.e. into an aerosol mixture such as fog or a gas, and may operate as floating touchscreen when connected to a PC by a USB cable. However, with the heliodisplay, the image is displayed into two-dimensional space (i.e. planar). While the Heliodisplay images appear 3 dimensional ("3-D"), the images are planar and have no physical depth reference.

Unfortunately, theses existing uses have certain limitations in distribution and deployment. For example, functionally, the heliodisplay is a two dimensional display that projects against a curtain of air, or even glass. While, the heliodisplay may give the appearance of 3-D, the images displayed and the interface are 2-D. As such, the heliodisplay is not a true 3-D holographic display, and thus the interface operates on a two-dimensional plane, not taking advantage of a full three dimensional coordinate system.

Accordingly, there is a need for an integrated User Interface that utilizes true 3-D technology to create a computing and multimedia environment where a user can easily navigate by touch, mouse or pointer system to effectively navigate the interface to raise the level of the user experience to a true 3-D environment, with the goal of attaining elements of the attenuated clarity, realism and benefits of that environment that match our day to day conventional interactions with the 3-D world. The present invention relates to the creation of a holographic user interface display system that combines physical media or digitally stored files with a digital holographic player hardware system. The result is the creation of a multimedia holographic user interface and viewing experience, where a variety of graphical schematics enabling cohesive access to information utilizing pyramids, blocks, spheres, cylinders, other graphical representations, existing templates, specific object rendering, free form association, user delegated images and quantum representations of information to form a user interface where the available tools combine over time to match a users evolving data and requests.

In one example embodiment of the invention, a system and corresponding method for providing a 3-D user interface involves display images in a 3-D coordinate system. Sensors are configured to sense user interaction within the 3-D coordinate system, so that a processor may receive user interaction information from the sensors. The sensors are able to provide information to the processor that enables the processor to correlate user interaction with images in the 3-D coordinate system.

Embodiments of the invention provide a holographic user interface which transforms the computing environment to enable a three dimensional holographic style user interface and display system. The system utilizes holographic projection technology along with programmed quadrant matrixes sensor field to create multiple methods to select and interact with data and user interface tools and icons presented in a holographic format. The system may be used for interconnecting or communicating between two or more components connected to an interconnection medium (e.g., a bus) within a single computer or digital data processing system.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the invention.

DETAILED DESCRIPTION OF THE INVENTION

A description of example embodiments of the invention follows.

The present invention, in accordance with one embodiment relates to the creation of a holographic user interface which transforms the computing environment to enable a three dimensional (3-D) holographic style user interface and display system. The system utilizes holographic projection technology along with programmed quadrant matrixes sensor field to create multiple methods to select and interact with data and user interface tools and icons presented in a holographic format.

Figure 1:
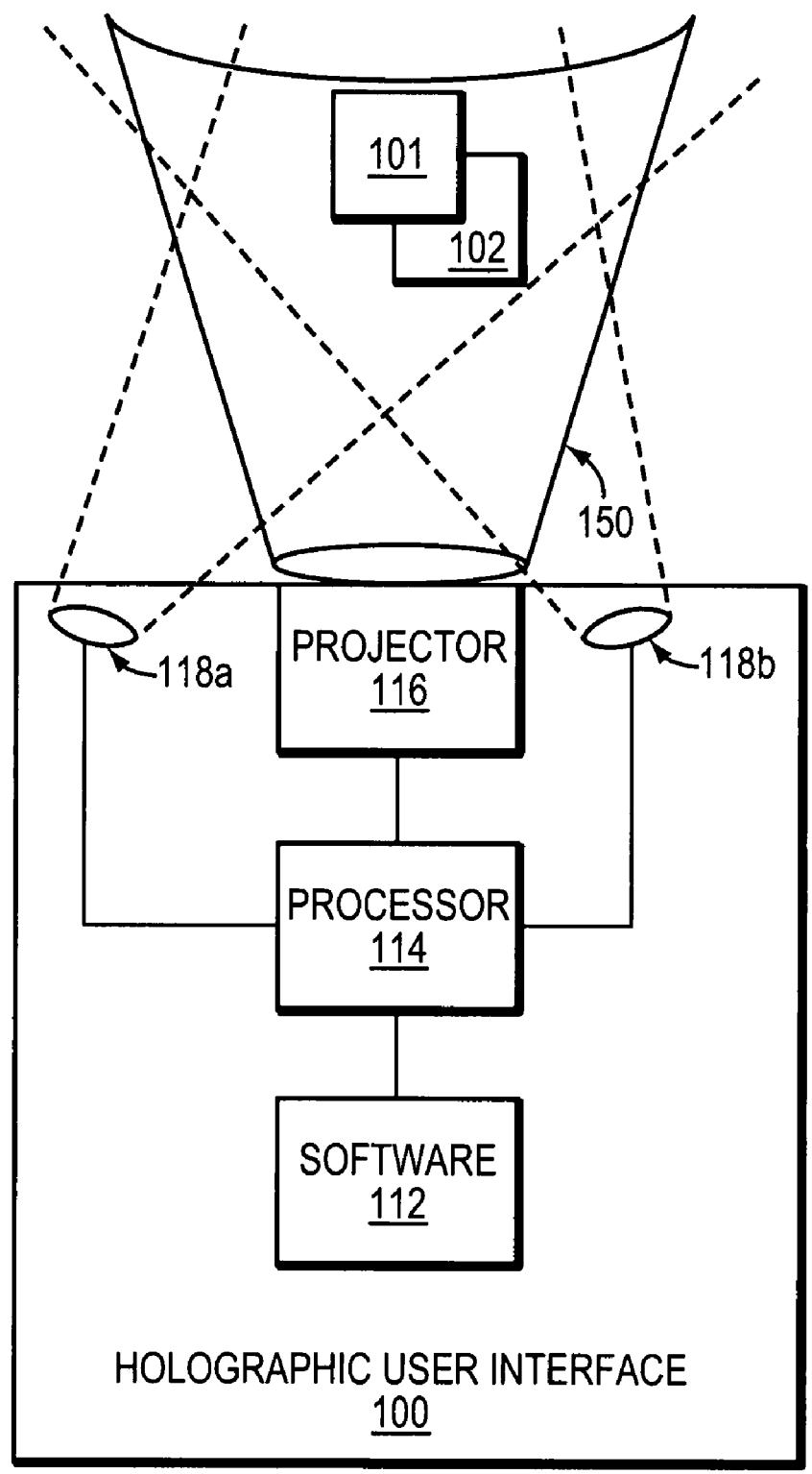
FIG. 1 is a block diagram illustrating a holographic user interface according to an embodiment of the present invention.

FIG. 1 illustrates a holographic user interface 100 according to one example embodiment of the present invention. The holographic user interface 100 includes a processor 114 that operates software 112, controls a holographic image projector 116, and processes information obtained from sensors 118a, 118b. The projector may generate a 3-D display image 101, 102 within a 3-D coordinate system 150. The sensors 118a and 118b may be directed toward the 3-D coordinate system to sense user interaction with images within the 3-D coordinate system. If a user were to interact with an image 101 or 102, the sensors 118a and 118b would provide coordinate information that the processor can correlate with the projected images 101 and 102 in the 3-D coordinate system.

Figure 2:
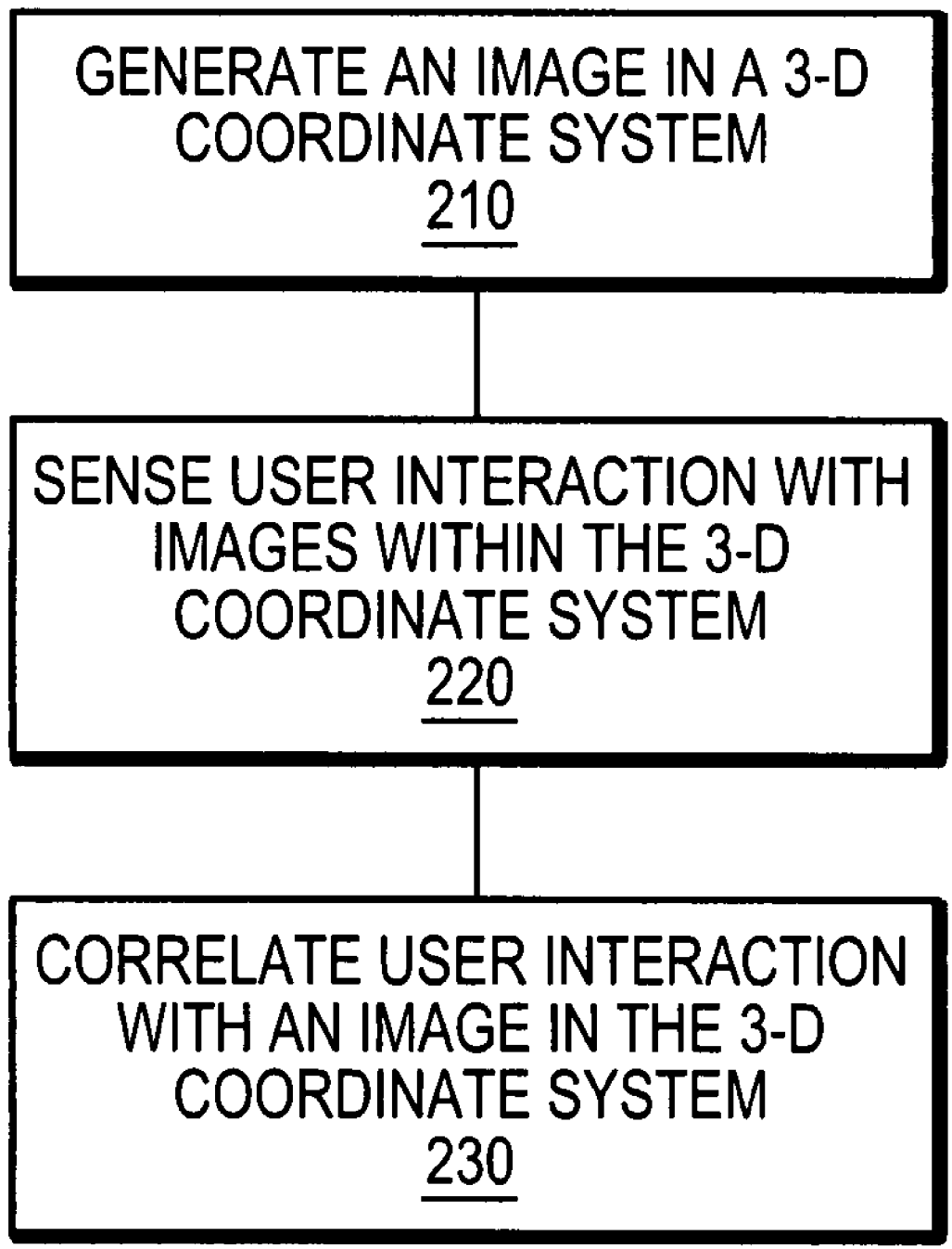
FIG. 2 is a flow chart diagram illustrating a method for providing a 3 dimensional (3-D) interface with a system.

FIG. 2 is a flow chart that illustrates the method for providing a 3 dimensional (3-D) interface with a system. The interface generates (210) an image in a 3-D coordinate system. In operation, an embodiment of the interface deploys holographic information in the form of a user interface template as a default once turned on. Sensors on the interface sense (220) a user's interaction with the 3-D coordinate system. The sensing may occur through the use of matrixes or triangulated data points that correspond to specific functions and data display which the system is capable of displaying. The interface may then correlate (230) the user's interaction with an image in the 3-D coordinate system. By sensing and correlating interaction with the 3-D coordinate system, the interface allows a computer system or display to interact with a user. The holographic data displayed by the system becomes a result of a selection process by the user who triggers data being displayed by key strokes or by the use of a three dimensional interactive interface. Users location commands are read by the system at their exact points and then the system deploys the appropriate response or holographic media based upon the users specific request made via the location of that request.

Figure 3:
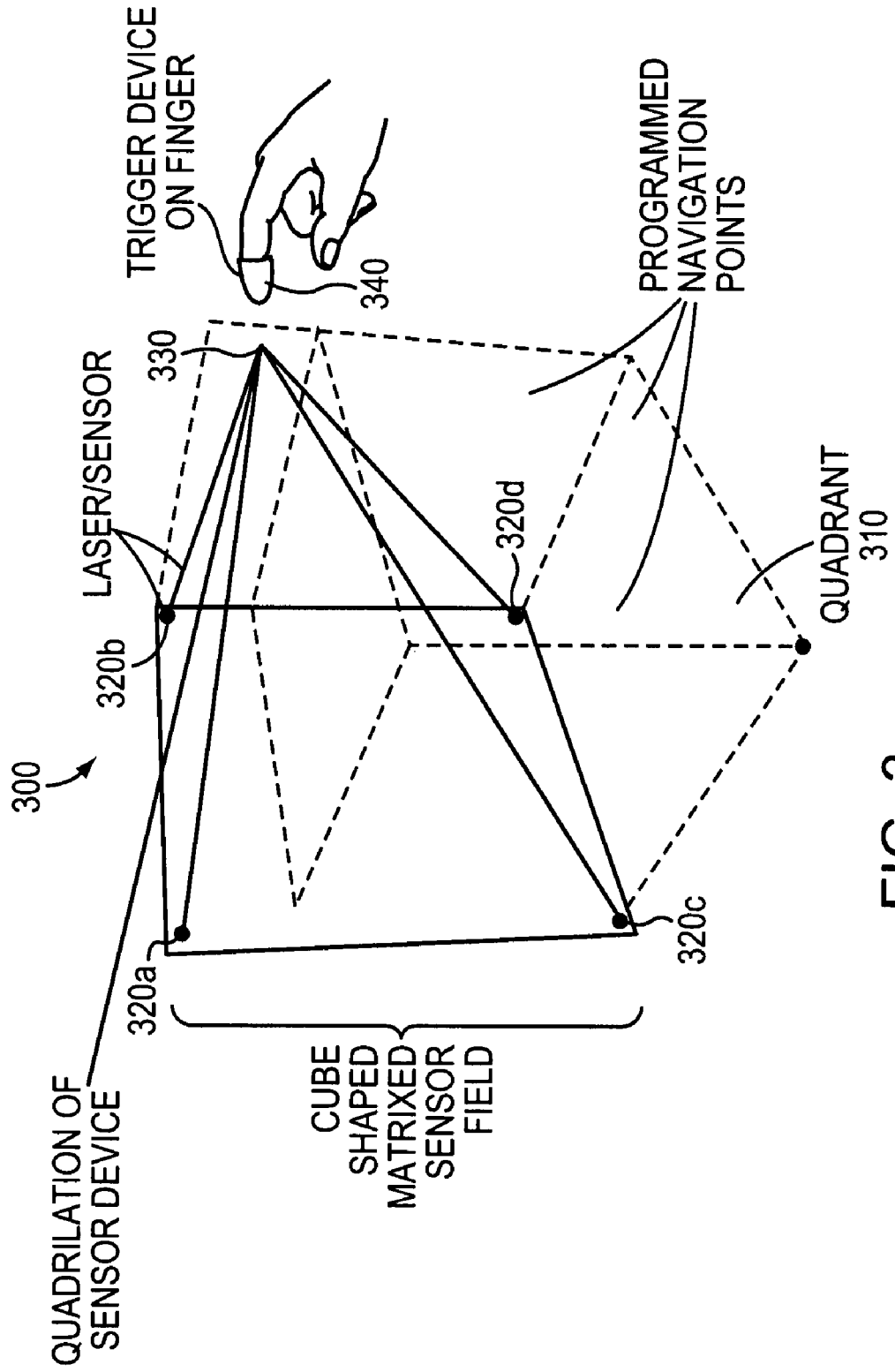
FIG. 3 is a perspective view of a sensor field used in connection with embodiments of the present invention.

FIG. 3 illustrates a sensor field used in connection with embodiments of the present invention. The embodiment illustrated in FIG. 3 includes four laser sensors 320a-d. The manipulatable interface may be a relatable and interactive holographic media via the use of a sprocketed sensor system which deploys from the display either via a built in or retrofit hardware peripheral that creates a quadrilateral angle navigation system to determine the exact point 330 of a fingertip touch point 340 within a quadrant 310 (also referred to as a "3-D coordinate system"). This touch point, if effectively deployed by the user, is mapped to the image deployed by the holographic hardware and software system, as each image that is displayed in the system is displayed from an exacting point at an exacting place in space that has been preconfigured to match specific points on the quadrilateral sensor system. The points in space attached to programmed images are then matched to touch points made by the user. The touch point may trigger the same functions as a mouse and cursor.

One skilled in the art will recognize that other sensing configurations or devices may be used to sense a location within a 3-D coordinate system. For example, the sensors may be laser sensors configured to provide data to triangulate a point within the 3-D coordinate system, photo voltaic sensors, photo electric light sensors, or image sensors. The sensors may be programmed to identify the specific location of the touchpoint 330 that may extend through multiple planar images, to identify a single image located at a 3-D coordinate space.

Figure 4:
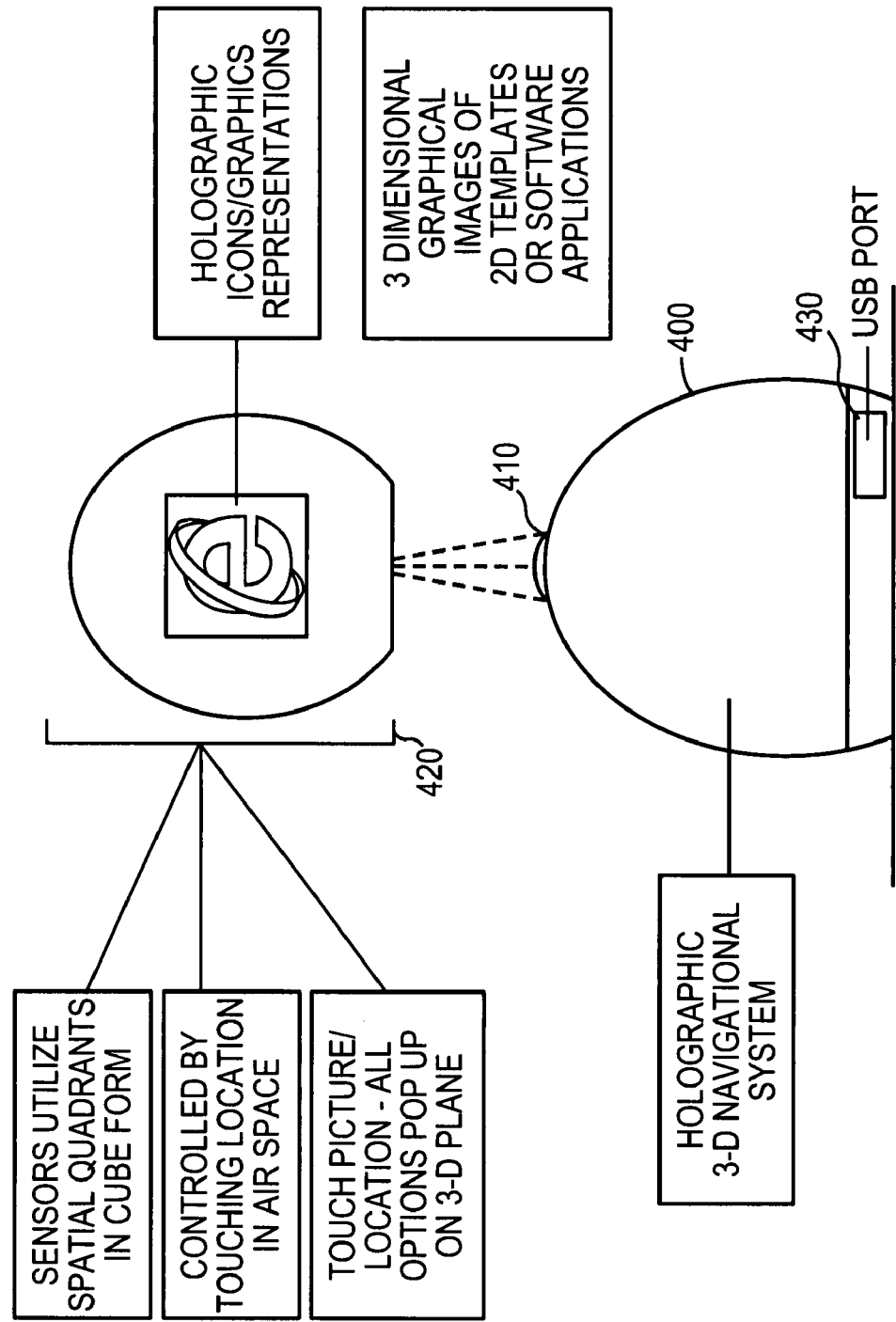
FIG. 4 is a front view of a holographic user interface device according to one embodiment of the present invention.

FIG. 4 illustrates a holographic user interface device 400 according to one embodiment of the present invention. The device 400 has a port 410 that may provide the output projector for the multi-dimensional display, and also the sensors for detecting user interaction. The projector and sensors map out a 3-D coordinate system 420 to serve as the holographic user interface. A communications port 430, such as a universal serial bus ("USB") port or wireless connection, serves to allow the device 400 to communicate with a computer system. The holographic system may be based upon our prior holographic system technology filing where the User Interface icons and documents may be saved to a fixed media form and activated by commands sent from the operating system to the device managing the index on the holographic fixed media system and display. Similarly, any system that utilizes holographic displays may also be manipulated and selected using the sensor interface system.

Figure 5:
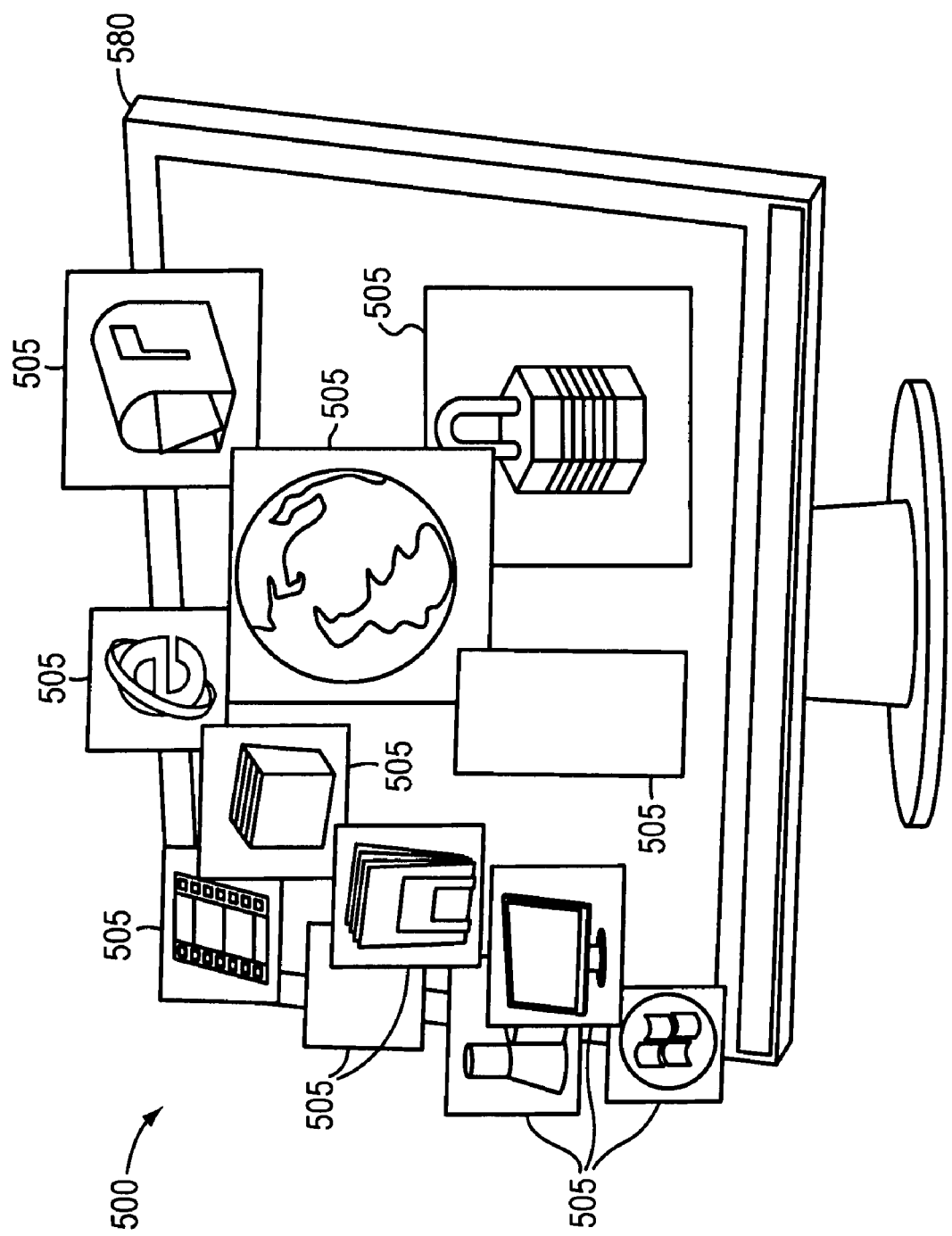
FIG. 5 is a perspective view of a diagram of a holographic user interface according to another embodiment of the present invention.

FIG. 5 is a perspective view of a diagram of a holographic user interface 500 according to another embodiment of the present invention. The holographic user interface device may operate with a projection screen 580. Images 505 displayed by the projection screen 580 of the user interface 500 can include shapes, graphic images, animation sequences, documents, audiovisual programs, a logical display based upon the user's patterns of use with the system (such as always going online first, always working on a word document second and always viewing pictures or videos from the user's hard drive third). These icons could be presented to the user in an order of priority on the display representing the user's evolving use habits based upon history, including distinct changes based upon day, time and date. Traditional UI operating system icons. such as Word document icons and portable document format ("PDF") icons, may be presented in a holographic format. Documents may be revised and read through in a traditional manner or documents, or any displayed item, may revert back to the flat display monitor based upon user command.

Those of ordinary skill in the art should recognize that methods involved in providing a 3-D user interface with a system may be embodied in a computer program product that includes a computer usable medium. For example, such a computer usable medium can include a readable memory device, such as a solid state memory device, a hard drive device, a CD-ROM, a DVD-ROM, or a computer diskette, having stored computer-readable program code segments. The computer readable medium can also include a communications or transmission medium, such as electromagnetic signals propagating on a computer network, a bus or a communications link, either optical, wired, or wireless, carrying program code segments as digital or analog data signals. The program code enables and supports computer implementation of the operations described in FIGS. 1 and 2 or other embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A system for a 3 dimensional (3-D) user interface, the system comprising:
   a 3 dimensional (3-D) projector configured to display images in a 3-D coordinate system;
   a programmed quadrant matrix sensor deployed from the 3-D projector, wherein the programmed quadrant matrix sensor is configured to sense user interaction within the 3-D coordinate system, and wherein the programmed quadrant matrix sensor comprises four laser sensors;
   a processor configured to receive user interaction information from the sensors, to triangulate a position of user interaction within the 3-D coordinate system, and to correlate user interaction with images in the 3-D coordinate system.

2. The system of claim 1 wherein the processor is further configured to provide an indication responsive to a correlation of user interaction with images in the 3-D coordinate system.

3. The system of claim 2 wherein the indication is a change in display images in the 3-D coordinate system.

4. The system of claim 2 further comprising a communications port coupled to the processor and configured to provide communications interface with a computer system.

5. The system of claim 1 wherein the images are holographs.

6. A method for providing a 3 dimensional (3-D) interface with a system, the method comprising:
   a 3-D projector generating an image in a 3-D coordinate system;
   a programmed quadrant matrix sensor sensing user interaction with images within the 3-D coordinate system, wherein programmed quadrant matrix sensor is deployed from the 3-D projector, and wherein the programmed quadrant matrix sensor comprises four laser sensors; and
   correlating user interaction with an image in the 3-D coordinate system.

7. The method of claim 6 further comprising generating an indication responsive to a correlation of user interaction with the image in the 3-D coordinate system.

8. The method of claim 7 wherein the indication is a change in display images in the 3-D coordinate system.

9. The method of claim 7 further comprising providing the indication to a device on a network.

10. A non-transitory computer readable medium containing computer instructions stored therein for causing a computer to:
    generate an image in a 3-D coordinate system using a 3-D projector;
    sense user interaction with images within the 3-D coordinate system via a programmed quadrant matrix sensor, wherein programmed quadrant matrix sensor is deployed from the 3-D projector, wherein the programmed quadrant matrix sensor comprises four laser sensors, and wherein the sensing includes using the four laser sensors to geometrically identify a position within the 3-D coordinate system;
    correlate user interaction with an image in the 3-D coordinate system; and
    generate an indication responsive to a correlation of user interaction with the image in the 3-D coordinate system.

* * * * *